United States Patent
Edwards et al.

(10) Patent No.: US 8,281,043 B2
(45) Date of Patent: Oct. 2, 2012

(54) OUT-OF-BAND ACCESS TO STORAGE DEVICES THROUGH PORT-SHARING HARDWARE

(75) Inventors: David A. Edwards, Granite Bay, CA (US); Eng Hun Ooi, Georgetown (MY); Venkat R. Gokulrangan, Portland, OR (US); Hormuzd M. Khosravi, Portland, OR (US); Chai Huat Gan, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 12/836,341

(22) Filed: Jul. 14, 2010

(65) Prior Publication Data

US 2012/0017011 A1    Jan. 19, 2012

(51) Int. Cl.
G06F 3/00 (2006.01)
G06F 5/00 (2006.01)
(52) U.S. Cl. .................... 710/5; 710/6; 710/36; 710/40; 710/58
(58) Field of Classification Search .......................... None
See application file for complete search history.

(56) References Cited

U.S. PATENT DOCUMENTS

| | | | |
|---|---|---|---|
| 6,351,782 B1 | 2/2002 | Reid | |
| 6,845,387 B1 * | 1/2005 | Prestas et al. | 709/203 |
| 2003/0154281 A1 * | 8/2003 | Mitsuoka et al. | 709/225 |
| 2004/0199715 A1 * | 10/2004 | Ellis et al. | 711/105 |
| 2006/0280195 A1 * | 12/2006 | Lopez et al. | 370/419 |
| 2007/0260775 A1 * | 11/2007 | Bita et al. | 710/36 |
| 2008/0082811 A1 | 4/2008 | Davis et al. | |
| 2008/0183882 A1 | 7/2008 | Flynn et al. | |
| 2011/0173326 A1 * | 7/2011 | Lambert et al. | 709/226 |
| 2011/0289146 A1 * | 11/2011 | Khosravi et al. | 709/205 |

OTHER PUBLICATIONS

International Search Report for International Application No. PCT/US20111043850, dated Feb. 27, 2012, 11 pages.

* cited by examiner

*Primary Examiner* — Henry Tsai
*Assistant Examiner* — Kris Rhu
(74) *Attorney, Agent, or Firm* — Barnes & Thornburg, LLP; Glen M. Kellett

(57) ABSTRACT

A method, apparatus, system, and computer program product for enabling out-of-band access to storage devices through port-sharing hardware. Providing out-of-band access to storage devices enables system management functions to be performed when an operating system is non-functional as well as when the operating system is active. Storage commands originating with a management service can be interleaved with storage commands issued by the host operating system. The host operating system maintains ownership and control over its storage devices, but management activities can be performed while the host operating system is operational.

18 Claims, 3 Drawing Sheets

OUT-OF-BAND ACCESS TO STORAGE DEVICES THROUGH PORT-SHARING HARDWARE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to management of enterprise and client/server computing environments.

BACKGROUND

Online storage services such as data backup and recovery, anti-virus scan, disk repair, removal of malware and so forth, are currently broadly available to client computers through communication with remote network servers on which storage tools are installed. The communication between the client computers and remote servers is typically established using software agents installed on the client computers. However, such software agents are not always readily installed and may be shut down or infected by a virus or malware on the client computers.

Also, current online storage services and software agents are dependent on the operating system of the client computers. Thus, an operating system must be provisioned to the client system before online storage services can be provided. Furthermore, when the operating system is impaired or paralyzed, the remote servers will lose the opportunity to access the mass storage of the client computers and cannot provide the online storage services to the client computers.

DETAILED DESCRIPTION

Embodiments of the present invention may provide a method, apparatus, system, and computer program product for enabling out-of-band access to storage devices through port-sharing hardware. Providing out-of-band access to storage devices enables system management functions to be performed when an operating system is non-functional as well as when the operating system is active. Storage commands originating with a management service can be interleaved with storage commands issued by the host operating system. The host operating system maintains ownership and control over its storage devices, but the present invention allows management activities to be performed while the host operating system is operational.

Figure 3:
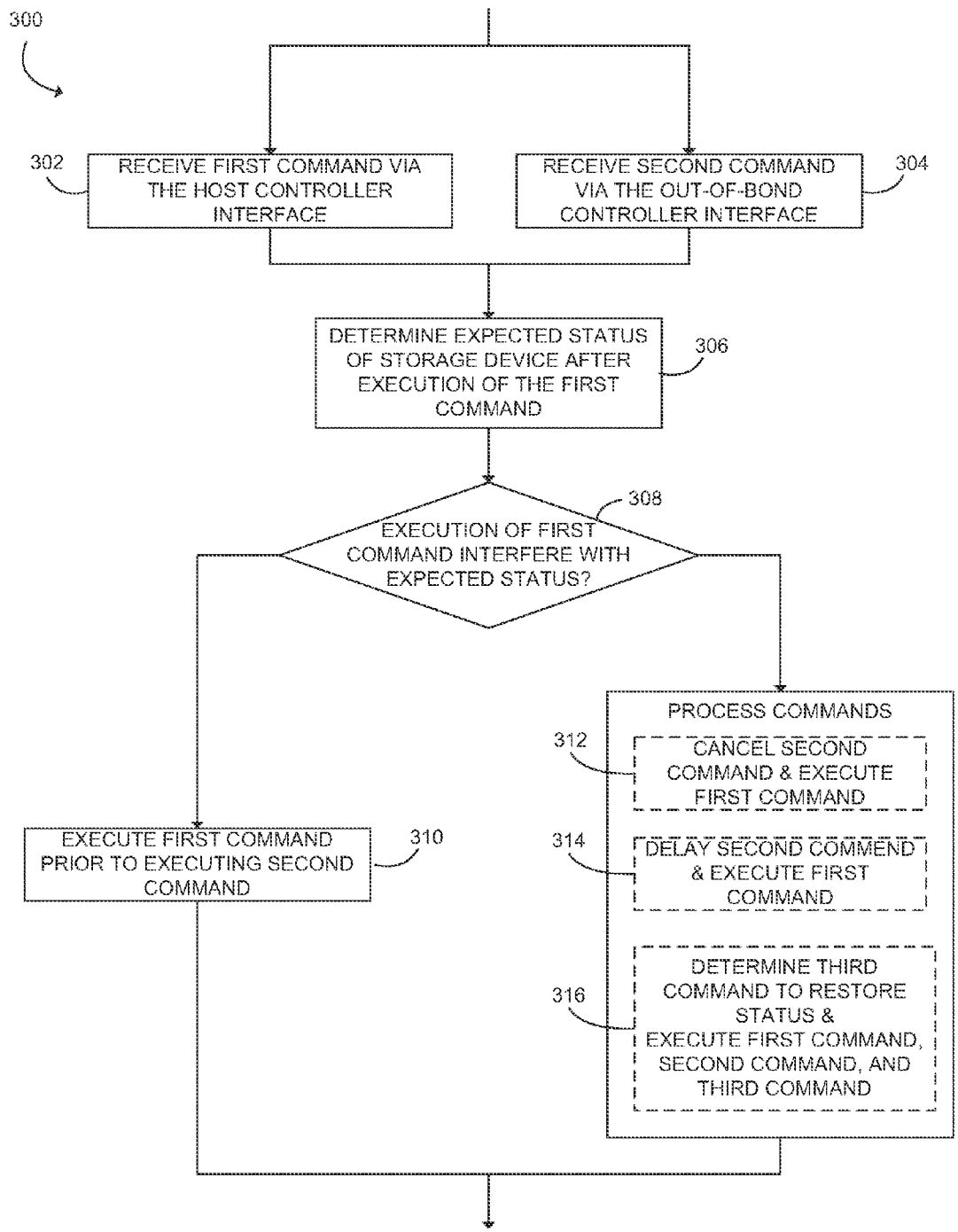
FIG. 3 is a simplified flowchart of one embodiment of a method to enable out-of-band access to storage devices.

In one embodiment as shown in FIG. 3, a method 300 includes receiving a first command to access the storage device via the host controller interface (step 302); receiving a second command to access the storage device via the out-of-band controller interface (step 304); determining an expected status of the storage device after execution of the first command (step 306); determining whether executing the second command would interfere with the expected status (step 308); and if executing the second command would not interfere with the expected status, executing the first command prior to executing the second command, wherein the second command is executed without involvement of the host operating system (step 310). If executing the second command would interfere with the expected status, the method may further include canceling the second command and executing the first command (step 312); delaying the second command until a desired status of the storage device is achieved, executing the first command and executing the second command when the desired status of the storage device is achieved (step 314); and/or determining a third command to restore the expected status after executing the second command, and executing the first command, the second command, and the third command while delaying signaling completion of the first command until after the third command has executed (step 316). In one embodiment, the host operating system is active when the first and second commands are received and while the first and second commands are executed. The method may further include placing the first command into a first memory associated with the host controller interface; protecting the first memory from access by the out-of-band controller interface; placing the second command into a second memory associated with the out-of-band controller interface; and protecting the second memory from access by the host operating system and the host controller interface. A system and a computer program product with instructions for performing the method are also provided.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Storage services herein include but are not limited to initial provisioning of an operating system image to client computers, data backup and recovery, disk repair, anti-virus scan and malware removal, installation of security systems, and system performance optimization.

The term "out-of-band" is used herein to describe communication independent from a main stream, such as communication between a server device and a management module of a client device that is conducted independently of the operating system (OS) of the client device.

Figure 1:
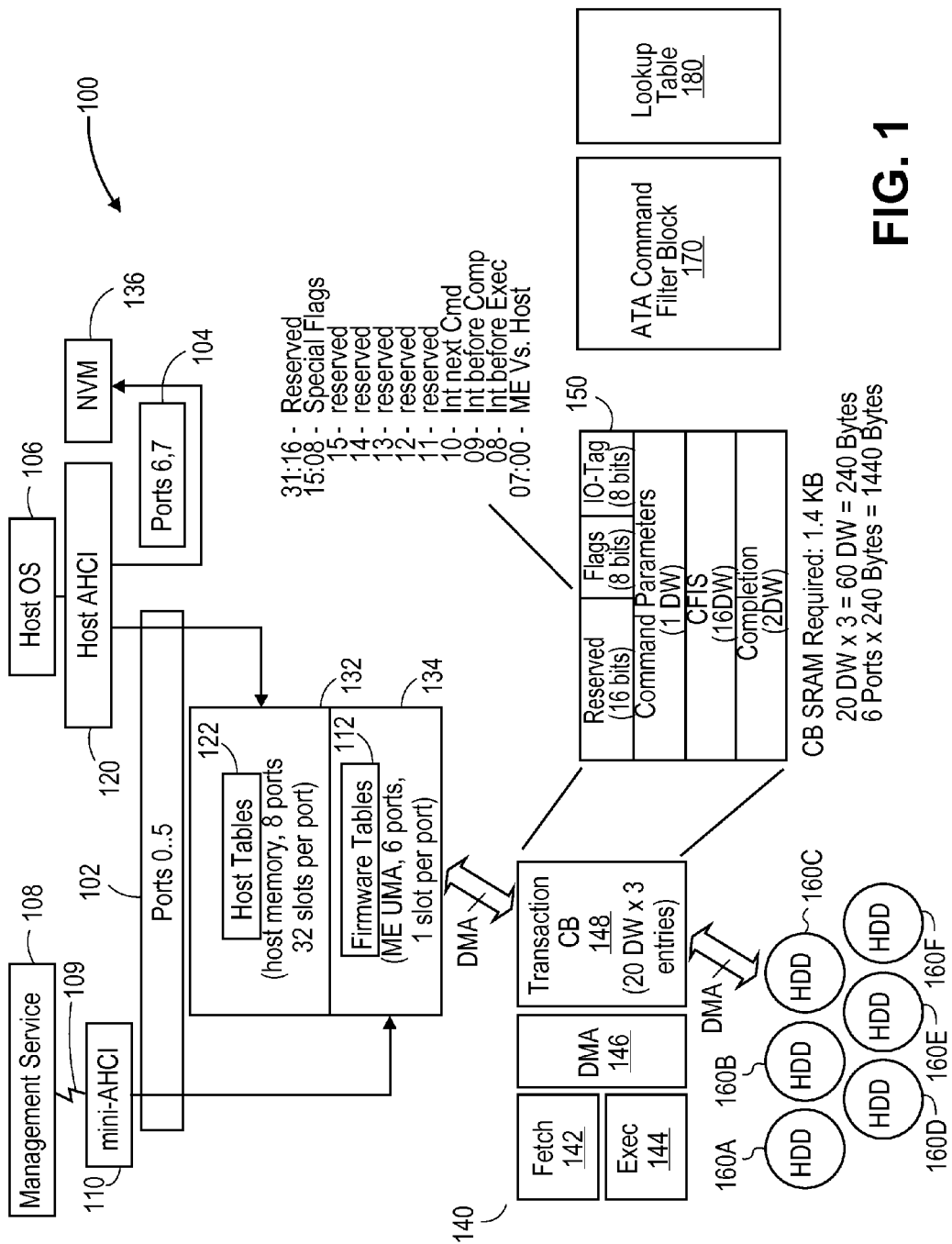
FIG. 1 is a block diagram of a system configured to enable out-of-band access to storage devices through port-sharing hardware in accordance with one embodiment of the invention.

FIG. 1 is a block diagram of a system 100 configured to enable out-of-band access to storage devices through port-sharing hardware in accordance with one embodiment of the invention. Mini-advanced host controller interface (AHCI) 110 represents an out-of-band controller interface that shares ports 102 (individually labeled ports 0 through 5) with Host AHCI 120. Mini-AHCI 110 is inaccessible by a host operating system 106 for system 100, whereas Host AHCI 120 is accessible by host operating system 106. Mini AHCI 110 provides access to storage devices 160A through 160F of system 100 by a remote storage management service 108 providing storage services to system 100 via network connection 109. The access provided by mini-AHCI 110 is provided independently of and without the assistance of host operating system 106. Host AHCI 120 provides access to storage devices 160A through 160F of system 100 by the host operating system 106. Host AHCI 120 also provides access to ports 104 (individually labeled ports 6 and 7) to provide access to non-volatile memory 136 to the host operating system.

When a storage command is issued via mini-AHCI 110, mini-AHCI 110 places the command information into a firmware table 112 stored in a memory ME UMA 134 set aside for processing management commands. The command information will contain the command and pointers to the data upon which the command is to operate. These data pointers will be translated into pages the storage devices 160A through 160F can access. Mini-AHCI 110 sends a signal to notify command processing block 140 that a command has been placed into memory. Memory ME UMA 134 contains one slot for each of the six shared ports 102 (individually labeled ports 0 through 5), thereby allowing one management command to be processed for each port. Firmware tables 112 stored in memory ME UMA 134 are inaccessible by the host operating system 106 and are only accessible via the mini-AHCI interface 110.

When a storage command is issued by the host operating system via host AHCI 120, host AHCI 120 places command information into host table 122 stored in a host memory 132 location. The command information will include both command data and pointers to the data upon which the command is to operate. These data pointers will be translated into pages the storage devices 160A through 160F can access. Host AHCI 120 sends a signal to notify command processing block 140 that a command has been placed into memory. Host memory 132 contains 32 slots for each of the eight ports 102 and 104 (individually labeled as shared ports 0 through 5 and NVM ports 6 and 7), thereby allowing up to 32 commands to be processed for each port. Host tables 122 stored in host memory 132 are accessible by the host operating system 106 via host AHCI 120 but are inaccessible via the mini-AHCI interface 110. Memory ME UMA 134 is protected from access via host AHCI 120 via chipset hardware, and host memory 132 is likewise protected from access by access via mini-AHCI interface 110 via chipset hardware. If a memory reference address is out-of-range for the respective interface, the request to reference the memory is dropped by the hardware.

Command processing block 140 contains fetch and sequencer block 142, which fetches commands from the specified memory location (ME UMA 134 for management-initiated commands and host memory 132 for host-initiated commands). When a signal is received indicating that a command has been placed into a memory location, fetch and sequencer block 142 fetches the command information from either host memory 132 or ME UMA memory 134. Execution block 144 executes the command, and DMA block 146 places direct memory access instructions into a transaction circular buffer 148 for execution.

Fetch and sequencer block 142 fetches commands from the appropriate command table based on the controller (mini-AHCI 110 or Host AHCI 120) from which the command signal is received. The information is transferred via a DMA transfer via DMA block 146 into the head of Transaction Circular Buffer 148 (a hardware-based Queue). While the DMA transfer is in progress, the ATA Command Filter block 170 inspects the command information in order to set the Flags and IO-Tag fields of the transaction buffer entry, which is formatted in accordance with table 150 and is described in further detail below. During ATA command inspection by ATA Command Filter block 170, lookup table 180 is referenced against the unique ATA command identifier. When a command identifier match is made between the requested host command and an entry in lookup table 180, the Flags field of the transaction buffer entry 150 is set according to the lookup table data for that command identifier.

Once an entry is placed into the transaction circular buffer 148, the execution block 144 is signaled to execute commands from the tail of the transaction circular buffer 148. Before sending the command information to one of the devices 160A-F, execution unit 144 inspects the Flags field of the transaction circular buffer 148 entry it is about to execute. If the Interrupt Next Command bit is set, execution unit 144 will set an internal flag to interrupt the management service 108 when the next command is executed from the transaction circular buffer 148. If the Interrupt before Execution bit is set, the execution unit 144 will interrupt the management service 108 to make a decision, and continue execution once execution unit 144 receives a signal that execution can be continued, thereby allowing the management service 108 time to make decisions.

Once execution unit 144 determines that it is acceptable to send a command to one of the devices 160A-F, then execution unit 144 signals a DMA of the CFIS field of transaction circular buffer entry 150 from the transaction circular buffer 148 to the device. Once the device completes the command, all status changes and response information that would normally go directly to the host AHCI 120 controller, now goes back into the transaction circular buffer 148. If the Interrupt before completion bit is set in the Flags field of the transaction circular buffer entry 150 for the command being executed, execution block 144 will interrupt the management service 108 to inspect the completion information. Once the management service 108 finishes inspecting the completion information, management service 108 signals the Execution unit 144 and execution unit 144 performs a DMA transfer of the completion information and status back to the host AHCI controller 120.

Transaction circular buffer entries are formatted in accordance with table 150. In the embodiment shown, each transaction circular buffer entry contains 20 double words. The total memory requirement for the transaction circular buffer is therefore 240 bytes for each port, for a total of 1.4 kilobytes for the six shared ports. In another embodiment, memory is also allocated in the transaction circular buffer for the two non-shared ports, thereby allocating memory for all eight ports. In the first double word of the transaction circular buffer entry format, bits 00 through 07 indicate whether the command was initiated by the host via host AHCI 120 or by the management service 108 via mini-AHCI 110. Bits 08 through 15 are used for special flags, such as bit 8 indicating that an interrupt is to be generated before execution of the command; bit 9 indicating that an interrupt is to be generated before the completion of the command is signaled; and bit 10 indicating that an interrupt is to be generated prior to processing the next command. Bit 10 enables inspection of the next command so that sequences of two or more commands that may affect the state of the device can be identified before the status of the device is changed. Bits 16 through 31 are reserved.

The second double word in the transaction circular buffer entry format is used for command parameters, sixteen double words are used for the Command Firmware Information Structure (CFIS, similar to the CFIS used in the AHCI specification), and two double words are are used for command completion parameters.

ATA Command Filter Block 170 is used by command processing block 140 to inspect commands to determine whether additional management processing is necessary. The operation of command processing block 140 is described further with reference to FIG. 2 below.

Referring again to FIG. 1, when platform 100 is fully powered, a portion of memory referred to as an upper memory area (UMA), ME-UMA 134, is available for use for management processing and for use by mini-AHCI 110. Host operating system 106 is not able to access ME-UMA 134, in general, because of a memory isolation mechanism that is configured by the Basic Input Output System (BIOS) at the time of system initialization. This memory isolation mechanism locks access to ME-UMA memory 134 before the host operating system 106 runs. By isolating this portion of memory for use by management services 108 from the host operating system 106, the integrity of management processing is protected from viruses or other malware that might infect host operating system 106.

Figure 2:
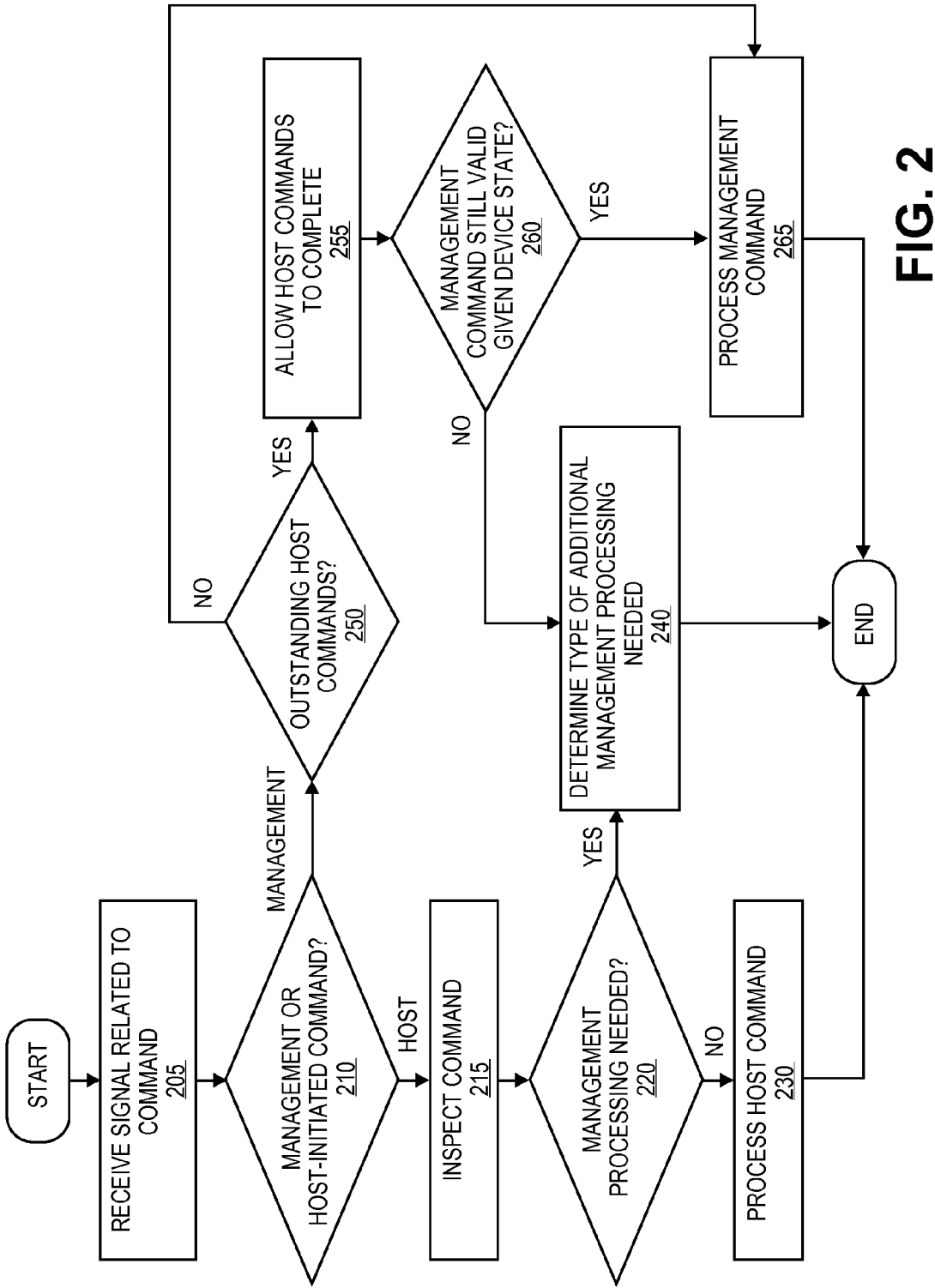
FIG. 2 is a flowchart of the operation of the port-sharing hardware and associated firmware to enable out-of-band access to storage devices in accordance with one embodiment of the invention.

FIG. 2 is a flowchart of the operation of the port-sharing hardware and associated firmware to enable out-of-band access to storage devices in accordance with one embodiment of the invention. The steps of FIG. 2 are described herein as being performed by components of command processing module 140 of FIG. 1. In "Receive Signal Related to Command" step 205, command processing module 140 receives a signal via either mini-AHCI 110 or host AHCI 120 that command information has been placed into either host tables 122 in host memory 132 or firmware tables 112 in ME UMA 134. Control proceeds to "Management or Host-Initiated Command?" decision point 210, where a decision is made whether the command was initiated by management service 108 or host operating system 106. If the command was initiated by host operating system 106, control proceeds to "Inspect Command" step 215, where the command information is retrieved from host tables 122 in host memory 132. The command is inspected to determine whether additional management processing is needed. For example, a simple read/write command to store data on the storage device may require no additional management processing, whereas a command to place the storage device into an idle state will require additional management processing to ensure that any subsequent management commands will return the device to the idle state upon completion. Control proceeds from "Inspect Command" step 215 to "Management Processing Needed?"decision point 215 to make the determination whether management processing is needed. If no management processing is needed at "Management Processing Needed?" decision point 220, as in the case with a simple read/write command, control proceeds to "Process Host Command" step 230 where the host command is executed. After the host command is executed, processing the host command is completed and the process ends.

At "Management Processing Needed?" decision point 220, if management processing is needed, control proceeds to "Determine Type of Additional Management Processing Needed" step 240. In a situation where the status of the device is changed by the host command, command processing module 140 may cause additional management processing to occur upon completion of the host commands. For example, command processing module 140 may set a flag when placing the host command into the transaction circular buffer 148 to ensure that an interrupt is generated prior to signaling that processing of the host command has completed. As another example, command processing module 140 may cancel any pending management commands if a host command has reset the storage device.

At "Management or Host-Initiated Command?" decision point 210, if the command was initiated by the management service 108 via mini-AHCI 110, control proceeds to "Outstanding Host Commands?" decision point 250. If no host commands are awaiting execution, control proceeds to "Process Management Command" decision point 265, where the management command is executed. After execution of the management command, processing the command is complete and the process ends.

At "Outstanding Host Commands?" decision point 250, if host commands are awaiting execution, control proceeds to "Allow Host Commands to Complete" step 255. All host commands in the queue for execution are allowed to complete before the management command is processed further. This delay in execution of the management command allows the storage device to come to a stable state before management services are performed on the storage device.

From "Allow Host Commands to Complete" step 255, control proceeds to "Management Command Still Valid Given Device State?" decision point 260. It is possible that the operations performed by the outstanding host commands have placed the storage device into a state where performing the management command at this stage would be invalid. For example, the host-initiated commands may have reset the storage device so that additional management commands are no longer needed. If the management command would be invalid if executed, control proceeds to "Determine Type of Additional Management Processing Needed" step 240. For example, it may be necessary to cause a different management command to be queued for execution. Alternatively, no additional management commands may be necessary, but it may be necessary to cause the pending management command to be canceled rather than executed. Furthermore, it may be necessary to control the flow of execution of commands by setting flags, such as a flag to cause the next command to be inspected prior to execution, a flag to require an interrupt before completion of processing the command is signaled, or a flag to require an interrupt after execution of the command.

At "Management Command Still Valid Given Device State?" decision point 260, if the management command remains valid, control proceeds to "Process Management Command" step 265. The management command is executed and processing the command is complete.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 100 of FIG. 1 may be controlled, at least in part, by input from conventional input devices, such as keyboards, mice, etc., and/or by commands received from another machine, biometric feedback, or other input sources or signals. Platform 100 may utilize one or more connections to one or more remote data processing systems (not shown), such as through a network interface controller (NIC), a modem, or other communication ports or couplings.

Platform 100 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems to enable out-of-band access to storage devices using port-sharing hardware. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
in an processing system comprising a processor, a memory, a storage device, a plurality of ports, a host operating system executed by the processor, a host controller interface accessible by the host operating system, and an out-of-band controller interface inaccessible by the host operating system, wherein the out-of-band controller interface shares a shared port of the plurality of ports with the host controller interface, performing the following:
receiving, with the host controller interface, a first command to access the storage device;
receiving, with the out-of-band controller interface, a second command to access the storage device;
determining, prior to executing the first command, an expected status of the storage device that is expected to result due to execution of the first command;
determining whether executing the second command would interfere with the expected status; and
in response to determining that executing the second command would not interfere with the expected status, executing the first command prior to executing the second command, wherein the second command is executed without involvement of the host operating system.

2. The method of claim 1, further comprising:
in response to determining that executing the second command would interfere with the expected status, canceling the second command and executing the first command.

3. The method of claim 1, further comprising:
in response to determining that executing the second command would interfere with the expected status, delaying the second command until a desired status of the storage device is achieved;
executing the first command; and
executing the second command when the desired status of the storage device is achieved.

4. The method of claim 1, further comprising:
in response to determining that executing the second command would interfere with the expected status, determining a third command to restore the expected status after executing the second command, and executing the first command, the second command, and the third command while delaying signaling completion of the first command until after the third command has executed.

5. The method of claim 1, wherein
the host operating system is active when the first and second commands are received and while the first and second commands are executed.

6. The method of claim 1, further comprising:
placing the first command into a first memory associated with the host controller interface;
protecting the first memory from access by the out-of-band controller interface;
placing the second command into a second memory associated with the out-of-band controller interface; and
protecting the second memory from access by the host operating system and the host controller interface.

7. A system comprising:
a processor;
a storage device;
a plurality of ports;
a host operating system executed by the processor;
a host controller interface accessible by the host operating system; and
an out-of-band controller interface inaccessible by the host operating system, wherein the out-of-band controller interface shares a shared port of the plurality of ports with the host controller interface;
a memory coupled to the processor, the memory comprising instructions for performing the following:
receiving a first command to access the storage device via the host controller interface;
receiving a second command to access the storage device via the out-of-band controller interface;
determining, prior to executing the first command, an expected status of the storage device that is expected to result due to execution of the first command;
determining whether executing the second command would interfere with the expected status; and
in response to determining that executing the second command would not interfere with the expected status, executing the first command prior to executing the second command, wherein the second command is executed without involvement of the host operating system.

8. The system of claim 7, wherein the instructions further comprise instructions for performing the following:
in response to determining that executing the second command would interfere with the expected status, canceling the second command and executing the first command.

9. The system of claim 7, wherein the instructions further comprise instructions for performing the following:
in response to determining that executing the second command would interfere with the expected status, delaying the second command until a desired status of the storage device is achieved;
executing the first command; and
executing the second command when the desired status of the storage device is achieved.

10. The system of claim 7, wherein the instructions further comprise instructions for performing the following:
in response to determining that executing the second command would interfere with the expected status, determining a third command to restore the expected status after executing the second command, and executing the first command, the second command, and the third command while delaying signaling completion of the first command until after the third command has executed.

11. The system of claim 7, wherein the instructions further comprise instructions for performing the following:
the host operating system is active when the first and second commands are received and while the first and second commands are executed.

12. The system of claim 7, wherein the instructions further comprise instructions for performing the following:
placing the first command into a first memory associated with the host controller interface;
protecting the first memory from access by the out-of-band controller interface;
placing the second command into a second memory associated with the out-of-band controller interface; and
protecting the second memory from access by the host operating system and the host controller interface.

13. A computer program product comprising:
a non-transitory, machine-accessible storage medium; and
instructions stored on the non-transitory, machine-accessible storage medium, wherein the instructions, when executed in a processing system, cause the processing system to perform operations, wherein the processing system comprises a processor, a memory, a storage device, a plurality of ports, a host operating system executed by the processor, a host controller interface accessible by the host operating system, and an out-of-band controller interface inaccessible by the host operating system, wherein the out-of-band controller interface shares a shared port of the plurality of ports with the host controller interface, and wherein the operations comprise:
receiving a first command to access the storage device via the host controller interface;
receiving a second command to access the storage device via the out-of-band controller interface;
determining, prior to executing the first command, an expected status of the storage device that is expected to result due to execution of the first command;
determining whether executing the second command would interfere with the expected status; and
in response to determining that executing the second command would not interfere with the expected status, executing the first command prior to executing the second command, wherein the second command is executed without involvement of the host operating system.

14. The computer program product of claim 13, wherein the instructions further cause the processing system to perform the following operations:
in response to determining that executing the second command would interfere with the expected status, canceling the second command and executing the first command.

15. The computer program product of claim 13, wherein the instructions further cause the processing system to perform the following operations:
in response to determining that executing the second command would interfere with the expected status, delaying the second command until a desired status of the storage device is achieved;
executing the first command; and
executing the second command when the desired status of the storage device is achieved.

16. The computer program product of claim 13, wherein the instructions further cause the processing system to perform the following operations:
in response to determining that executing the second command would interfere with the expected status, determining a third command to restore the expected status after executing the second command, and executing the first command, the second command, and the third command while delaying signaling completion of the first command until after the third command has executed.

17. The computer program product of claim 13, wherein the instructions further cause the processing system to perform the following operations:
the host operating system is active when the first and second commands are received and while the first and second commands are executed.

18. The computer program product of claim 13, wherein the instructions further cause the processing system to perform the following operations:
- placing the first command into a first memory associated with the host controller interface;
- protecting the first memory from access by the out-of-band controller interface;
- placing the second command into a second memory associated with the out-of-band controller interface; and
- protecting the second memory from access by the host operating system and the host controller interface.

* * * * *